April 25, 1950      J. J. WAGNER      2,505,312

CABLE ARMOR CONNECTOR

Filed Dec. 16, 1946

INVENTOR
JOHN J. WAGNER
BY Carl Miller
ATTORNEY

Patented Apr. 25, 1950

2,505,312

UNITED STATES PATENT OFFICE 2,505,312

CABLE ARMOR CONNECTOR

John J. Wagner, Flushing, N. Y.

Application December 16, 1946, Serial No. 716,635

1 Claim. (Cl. 285—6.5)

This invention relates to a connector for coupling cable armor, such as the well known B-X, which consists in helically wound flexible tubing, to fittings or housings, so that wires providing or controlling electrical service may be safely extended and connected in plate, and the armor retained against accidental displacement from the fitting or housing to which it is connected.

Another object of the invention is the provision of a connector for flexible tubing armor for electrical wires, which is formed with an internal screw thread with which the helix of the flexible armor tubing may be connected by a turning movement, and which can be separately connected to the fitting or housing, or any outlet or receptacle adapted to receive the connector.

With the above and other objects in view the invention comprises certain new and useful constructions, combinations, and arrangements of parts, clearly described in the following specification, and fully illustrated in the drawings, in which.

Figure 1:
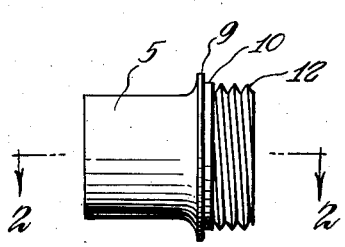
Fig. 1 is a side view of the connector.
Figure 2:
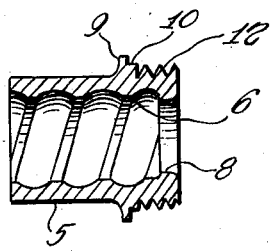
Fig. 2 is a central longitudinal sectional view, taken on line 2—2 of Fig. 1, looking in the direction of the arrows.

Referring to the drawings which illustrate the practical embodiment of the invention, 5 designates a tubular body, having an internal screw threaded coupling 6, adapted to match the helical turns of a flexible armor tubing 7, which is known to the trade as B-X. The inner end of the tubular body 5 is formed with an internal flange 8, which provides a stop for limiting the movement of the armor tubing 7 through the body.

Figure 3:
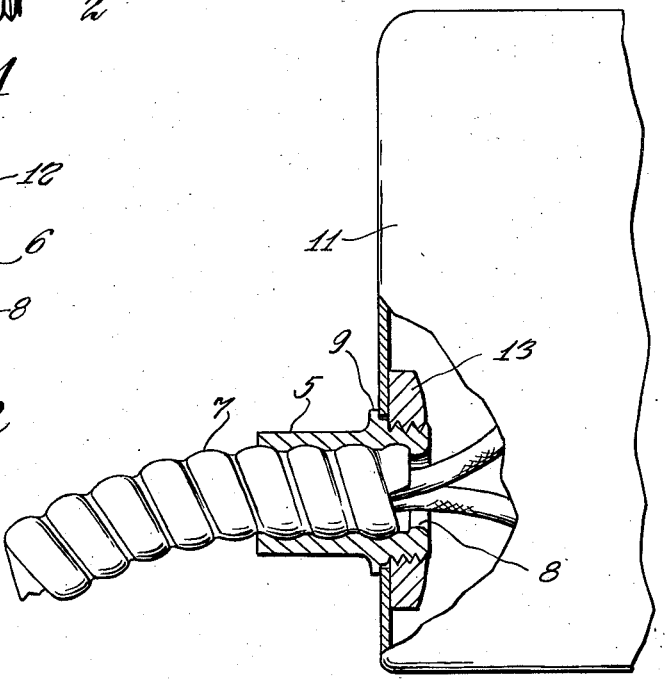
Fig. 3 is a vertical sectional view taken through a housing or receptacle, showing the connector secured in place by means of a nut and an armored cable screw threaded in the connector, the housing or receptacle being shown partly in elevation.

The body 5 is also formed with an external shoulder 9, which is formed with a cylindrical surface 10 adapted to have a snug fit in a circular opening of a sheet metal or drawn receptacle or housing, as indicated at 11 in Fig. 3, while the flange itself engages the side face of the housing or receptacle to limit movement of the cylindrical surface 10.

The flange or shoulder 9 is spaced inwardly from the forward end of the tubular body 5, and the body 5 is formed with an external screw thread 12. When the connector is used in connection with sheet metal or drawn receptacles or housings a clamping nut 13 may be coupled on the screw thread 12, in the manner shown in Fig. 3, so as to hold the flange or shoulder 9 against the outer face of the receptacle or housing under sufficient pressure to prevent accidental displacement of the nut and the connector.

The coupling of the nut 13 on the screw thread 12 may take place before the armored cable is coupled in the body 5 of the connector, or after this has been done.

Figure 4:
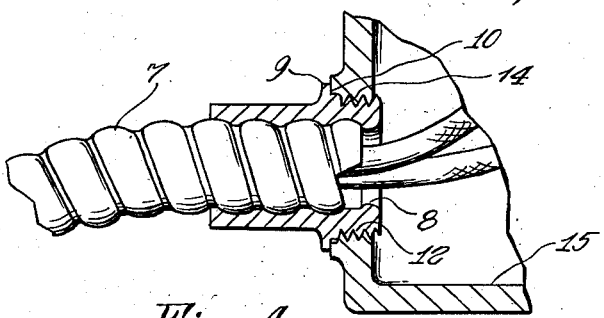
Fig. 4 is a similar view showing the connector screw threaded directly to a threaded nipple of a housing or receptacle, the retaining nut being omitted.

When the connector is used in connection with thick walled or cast housings or connector receptacles, the screw thread 12 may be coupled directly to the screw thread 14 of the housing or receptacle nipple 15, as shown in Fig. 4.

The connector may be used for any type of B-X armor or for Greenfield armor, and provides means for positively coupling the armor to the connector, so that opening of the wall of the armor is prevented and endwise displacement due to pulling is avoided.

It is understood that various changes in the details of construction, their combination and arrangement of parts, may be made in carrying out the invention, as defined by the claim hereof.

Having described the invention I claim as new:

A cable armor connector comprising a solid tubular body having an externally threaded portion by means of which the body may be attached to a receptacle, said threaded portion adapted to enter the receptacle, an internal flange extending inwardly from the inner end of the threaded portion of the body and of a length less than the length of the threaded portion, said internal flange serving as a shoulder for receiving the cable armor into the receptacle, said flange thereby being close to the inner end of the tubular body whereby the armor may extend substantially the full extent of the connector, the interior of the tubular body having more than one helical turn for threadedly receiving the cable armor and to retain the same within the tubular body, said helical turns extending to the flange and into the externally threaded portion, and an internal outer flange adapted for engagement with the receptacle, said threaded portion providing means for the securement of the connector to the receptacle, said internal flange extending inwardly a distance substantially equal to the thickness of the cable armor whereby to permit the cable wires within the armor to be supported free of the internal flange.

JOHN J. WAGNER.

REFERENCES CITED

The following references are of record in the file of this patent:

UNITED STATES PATENTS

| Number | Name | Date |
|---|---|---|
| 804,204 | Brown | Nov. 14, 1905 |
| 1,885,228 | Buchanan | Nov. 1, 1932 |